United States Patent
Taylor et al.

(10) Patent No.: US 7,101,506 B1
(45) Date of Patent: Sep. 5, 2006

(54) TAKEOUT AND TRANSFER APPARATUS AND METHOD FOR A WHEEL BLOW MOLDING MACHINE

(75) Inventors: Gregory D. Taylor, York, PA (US); Matthew A. Crider, York, PA (US); Bernd Klingenmaier, York, PA (US); Jeffery C. Enfield, Felton, PA (US)

(73) Assignee: Graham Packaging Company, L.P., York, PA (US)

( * ) Notice: Subject to any disclaimer, the term of this patent is extended or adjusted under 35 U.S.C. 154(b) by 498 days.

(21) Appl. No.: 10/696,911

(22) Filed: Oct. 30, 2003

Related U.S. Application Data

(62) Division of application No. 09/877,892, filed on Jun. 8, 2001, now Pat. No. 6,669,461.

(51) Int. Cl.
*B29C 49/70* (2006.01)

(52) U.S. Cl. .................. 264/543; 425/537; 425/540

(58) Field of Classification Search ............. 264/543; 425/537, 540
See application file for complete search history.

(56) References Cited

U.S. PATENT DOCUMENTS

| | | | |
|---|---|---|---|
| 1,805,177 A | 5/1931 | Hodnett | 198/547 |
| 1,867,785 A | 7/1932 | Tucker | 198/407 |
| 3,429,211 A | 2/1969 | Pelot | 425/315 |
| 3,432,586 A | 3/1969 | Stenger | 264/527 |
| 3,570,058 A | 3/1971 | Heinig et al. | 425/537 |
| 3,603,448 A | 9/1971 | Okano et al. | 198/626.4 |
| 3,626,589 A | 12/1971 | Hansen | 425/307 |
| 3,802,823 A | 4/1974 | Doughty et al. | 425/540 |
| 3,862,698 A | 1/1975 | Hafele | 264/527 |
| 3,949,860 A | 4/1976 | Bilodeau | 198/470.1 |
| 3,981,667 A | 9/1976 | Bilodeau | 425/539 |
| 4,041,124 A | 8/1977 | Seelye | 264/336 |
| 4,213,750 A | 7/1980 | Kubota et al. | 425/531 |
| 4,406,359 A | 9/1983 | Cole et al. | 198/626.1 |
| 4,514,166 A | 4/1985 | Ichizawa et al. | 425/537 |
| 4,752,206 A | 6/1988 | Nowicki et al. | 425/537 |
| 4,861,542 A | 8/1989 | Oles et al. | 264/542 |
| 5,435,433 A | 7/1995 | Jordan et al. | 198/626.5 |
| 5,551,862 A | 9/1996 | Allred, Jr. | 425/532 |
| 5,624,021 A | 4/1997 | Novak et al. | 198/626.1 |
| 5,632,370 A | 5/1997 | Grathoff | 198/626.2 |
| 5,681,597 A | 10/1997 | Aguilar et al. | 425/537 |
| 5,939,014 A | 8/1999 | Anderson et al. | 264/542 |
| 6,062,845 A | 5/2000 | Conaway et al. | 425/444 |
| 6,093,014 A | 7/2000 | Anderson et al. | 425/537 |
| 6,109,426 A | 8/2000 | Messer, III | 198/817 |
| 6,136,254 A | 10/2000 | Weber | 264/334 |
| 6,530,301 B1 | 3/2003 | Seitz et al. | 83/23 |

*Primary Examiner*—Suzanne E. McDowell
(74) *Attorney, Agent, or Firm*—Venable LLP; Stuart I. Smith

(57) ABSTRACT

Apparatus and method for transferring hollow blow molded articles from a vertically disposed wheel blow molding machine to a horizontally-disposed takeaway conveyor. Each mold on the wheel releases multiple blown articles at the six o'clock position on the wheel such that the articles fall freely from the wheel. An inclined end of a takeaway conveyor is located directly underneath the six o'clock position in order to receive the free falling blown articles and transport them to a horizontal transporting section of the takeaway conveyor. Flanges which extend upwardly from the conveying surface of the takeaway conveyor in combination with a powered endless positioning belt which extends a spaced distance along the inclined receiving end are utilized to confine the blown articles on the receiving end and uniformly position the blown articles on the takeaway conveyor.

11 Claims, 4 Drawing Sheets

TAKEOUT AND TRANSFER APPARATUS AND METHOD FOR A WHEEL BLOW MOLDING MACHINE

CROSS REFERENCE TO RELATED APPLICATION

The present application is a divisional of application Ser. No. 09/877,892 filed on Jun. 8, 2001 now U.S. Pat. No. 6,669,461.

FIELD OF THE INVENTION

The present invention relates to a transfer mechanism and method for efficiently transferring blow-molded articles from a vertically-disposed wheel blow molding machine to a horizontally-disposed takeaway conveyor, and more particularly, the present invention relates to a method and apparatus in which blown articles are released in free fall from a wheel blow molding machine and are positioned in an orderly uniform manner on a takeaway conveyor for transport to further operations, such as trimming.

BACKGROUND OF THE INVENTION

One type of blow molding machine utilized to manufacture blow molded containers is a wheel blow molding machine which is vertically disposed and rotates about a horizontal axis. An example is illustrated in FIG. 1 of U.S. Pat. No. 5,681,597 issued to Aguilar et al. and by the discussion provided in the Aguilar patent on column 2, line 52 to column 3, line 23. To this end, the blow molding machine has a plurality of molds positioned in a circular array following a circular path of motion. Each mold has a pair of mold halves which open to receive an extruded hollow parison, which close thereon so that the parison can be blown into conformance with the cavity defined by the mold, and which thereafter, open to release the blown article. All of these operations occur as the wheel continuously rotates at a constant speed, thereby forming and releasing blown articles in a continuous manner.

As best disclosed in the background section of U.S. Pat. No. 3,981,667 issued to Bilodeau on column 1, lines 15–30, it is known to discharge blown articles from wheel blow molding machines by gravity ejection onto a chute feeding a conveyor which supplies a surge hopper. The randomly arranged articles located in the hopper are then manually placed in a uniform manner onto other conveyors, or like apparatus, for transport to further processing stations, such as for trimming.

The above referenced Aguilar and Bilodeau patents disclose the use of automated takeout apparatus for increasing the speed of transfer of blown articles from a wheel blow molding machine to a downstream processing station and for eliminating the need of manually placing blown articles in a required uniform position on a takeaway conveyor. Known takeout apparatus includes vacuum pickup heads, star wheels, or buckets for individually picking one blown article per mold from the wheel blow molding machine and for placing the blown article in a uniform manner on a takeaway conveyor.

A further effort to increase the rate of forming blow molded articles is disclosed by U.S. Pat. No. 3,432,586 issued to Stenger and U.S. Pat. No. 3,862,698 issued to Hafele. To this end, a blown article is formed in a blow mold from a single parison and comprises a pair of containers integrally connected by a ring of scrap or flash material. The blown article is trimmed to remove the scrap/flash material and to separate the containers into two identical separate container bodies. This concept can be utilized to effectively double the output of bottles that can be formed during each revolution of a wheel blow molding machine.

It is also known to simultaneously extrude multiple separate parisons within a blow mold to simultaneously form multiple separate blown articles in each mold. See, for instance, U.S. Pat. No. 5,551,862 issued to Allred, Jr., U.S. Pat. No. 4,861,542 issued to Oles et al., and U.S. Pat. No. 3,802,823 issued to Doughty et al. Taking this concept one step further, as illustrated in FIG. 4 of the present application, a blow mold can be provided to accept multiple parisons and to utilize each parison to form multiple blown bottles. For instance, it is contemplated to use the mold illustrated in FIG. 4 of the present application to form four bottles per mold in a two by two manner, and to utilize the mold on a vertically disposed wheel blow molding machine having twenty-four identical such molds for forming approximately 500 to 850 bottles per minute.

The increased rate of forming bottles in a wheel blow molding machine and the use of multiple parisons for forming multiple blown articles in each mold significantly complicates the task of removing blown articles from a wheel blow molding machine and placing the blown articles in a uniform position on a horizontally disposed takeaway conveyor. In addition, vacuum and/or mechanical pick and place machines have relatively complicated structures and are relatively expensive to build and/or purchase. They require frequent maintenance and are prone to experiencing mechanical and pneumatic failures. The downtime of the pick and place machines can significantly reduce the overall rate of manufacture of containers. Thus, a more efficient and cost-effective transfer mechanism for transferring containers from a vertically-disposed wheel blow molding machine to a horizontally-disposed takeaway conveyor is desired.

While various ones of the takeout and transfer mechanisms disclosed in the above referenced patents may function satisfactorily for their intended purposes under certain circumstances, there is a need for a takeout and transfer apparatus and method for efficiently transferring blow-molded articles, two at time, in a continuous manner from a vertically-disposed wheel blow molding machine to a horizontally-disposed takeaway conveyor. The apparatus should have a relatively simple construction which requires a minimum of downtime, if any, and which is cost-effective to manufacture and/or purchase. The apparatus and method should be capable of reliably removing 500 to 850 blow molded bottles per minute from a wheel blow molding machine and placing the bottles in an orderly manner in a required uniform position on a horizontally disposed conveyor. In addition, the apparatus and method should be capable of handling multiple separate blown articles released simultaneously from a blow mold.

OBJECTS OF THE INVENTION

With the foregoing in mind, a primary object of the present invention is to provide a blown article takeout and transfer system which is capable of handling multiple simultaneously released blown articles from a vertically-disposed wheel blow molding machine and transferring the articles in a uniform orderly manner to a horizontally-disposed conveyor.

Another object of the present invention is to provide a high-speed bottle transfer system capable of transferring at least about 500 to about 850 bottles per minute from a vertically-disposed wheel blow molding machine to a horizontally-disposed conveyor.

A further object of the present invention is to provide a high-speed bottle transfer system which requires no significant preventative maintenance and which experiences minimal, if any, downtime.

A still further object of the present invention is to provide a novel method of transferring blow molded articles from a vertically-disposed wheel blow molding machine to a horizontally-disposed takeaway conveyor.

SUMMARY OF THE INVENTION

More specifically, the present invention provides an apparatus for use with a vertically disposed wheel blow molding machine to receive blown plastic articles from the wheel blow molding machine and to transfer the blown articles in a uniform and orderly manner to a downstream blown article processing station, such as a trimmer. The apparatus includes a powered takeaway conveyor for transporting blown articles from the wheel blow molding machine. The takeaway conveyor has an inclined receiving end and a substantially horizontally disposed transporting section extending from the receiving end. The receiving end is located underneath the wheel blow molding machine and receives blown articles released in a free gravitational vertical-fall from the wheel blow molding machine. A powered endless positioning belt is located above the takeaway conveyor and extends a spaced distance from the inclined receiving end of the takeaway conveyor for confining the blown articles falling from the wheel blow molding machine on the inclined receiving end of the takeaway conveyor so that the blown articles are positioned on the takeaway conveyor in a controlled uniform manner.

According to another aspect of the present invention, a method is provided for removing blown articles from a vertically disposed wheel blow molding machine and for placing the articles in a controlled uniform manner on a takeaway conveyor. Blown articles are released from a vertically-disposed wheel blow molding machine so that the blown articles exit the blow molding machine in a free gravitational vertical-fall. The free falling articles are received on an inclined end of a powered takeaway conveyor located underneath the wheel blow molding machine. Preferably, the blown articles are released two at a time from the wheel blow molding machine and are received two at a time on the takeaway conveyor. The blown articles are confined on the inclined end of the takeaway conveyor by a powered endless positioning belt located above the takeaway conveyor and extending along the inclined end at a spaced distance therefrom such that the blown articles, as received, are located between and are engaged by the inclined end and the positioning belt to position the blown articles on the takeaway conveyor in a controlled uniform manner. The blown articles are transported on the takeaway conveyor from the wheel blow molding machine to a downstream blown article processing station, such as trimmer.

BRIEF DESCRIPTION OF THE DRAWINGS

The foregoing and other objects, features and advantages of the present invention should become apparent from the following description when taken in conjunction with the accompanying drawings, in which.

DETAILED DESCRIPTION OF THE PREFERRED EMBODIMENT

Figure 2:
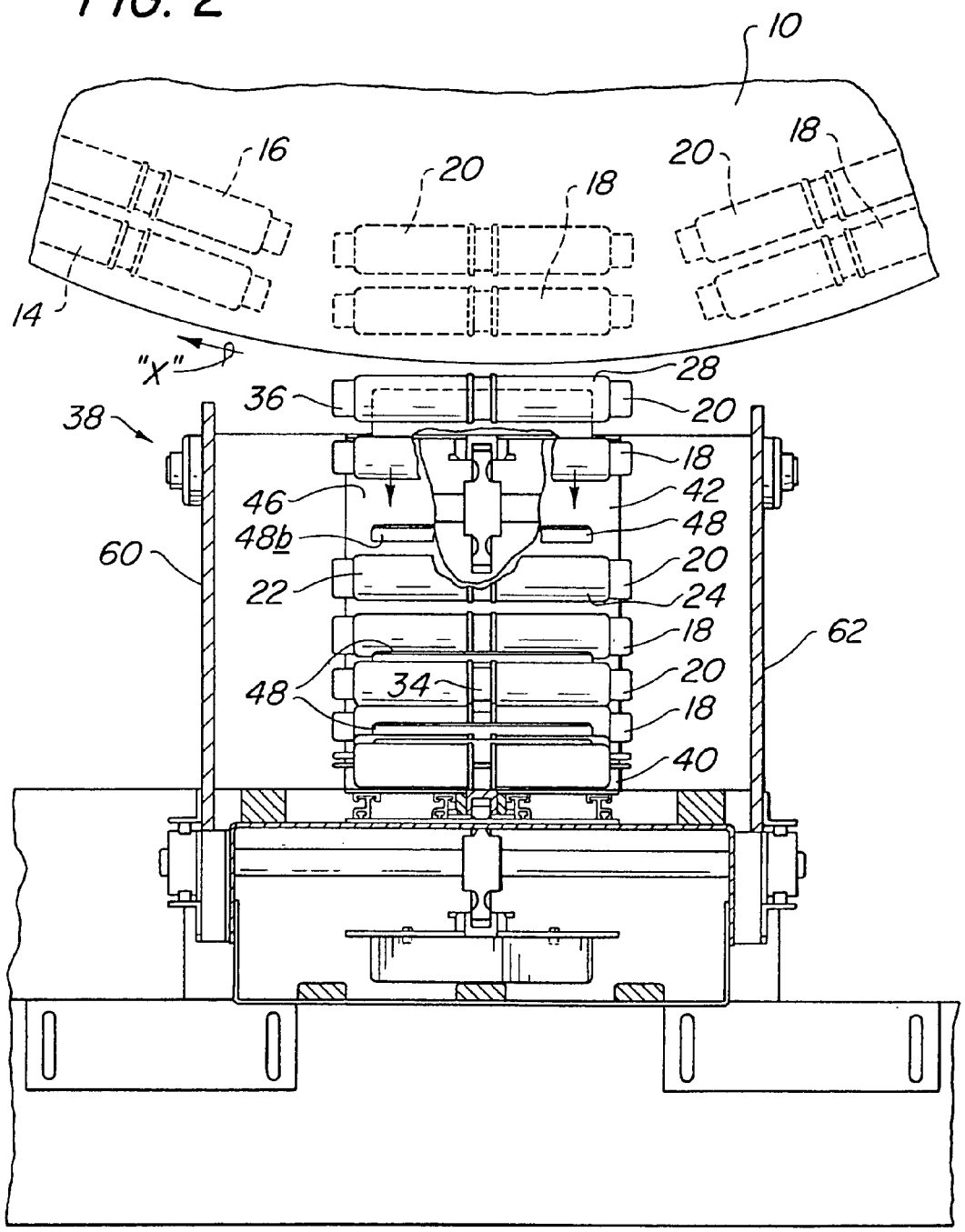
FIG. 2 is a partially cut away front elevational view of the blown article transfer apparatus of FIG. 1.
Figure 3:
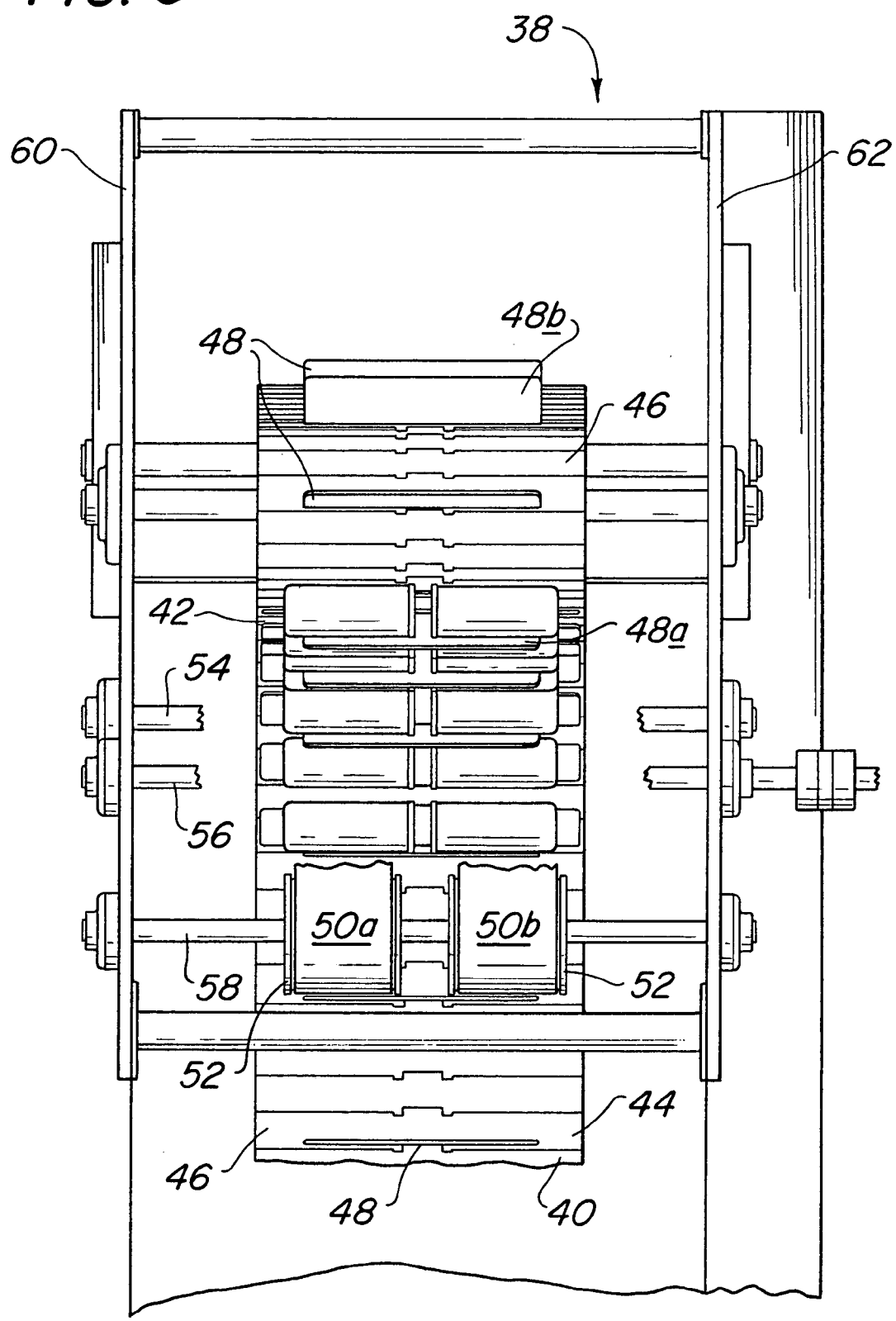
FIG. 3 is a partially cut away plan view of the blown article transfer apparatus of FIG. 1.
Figure 4:
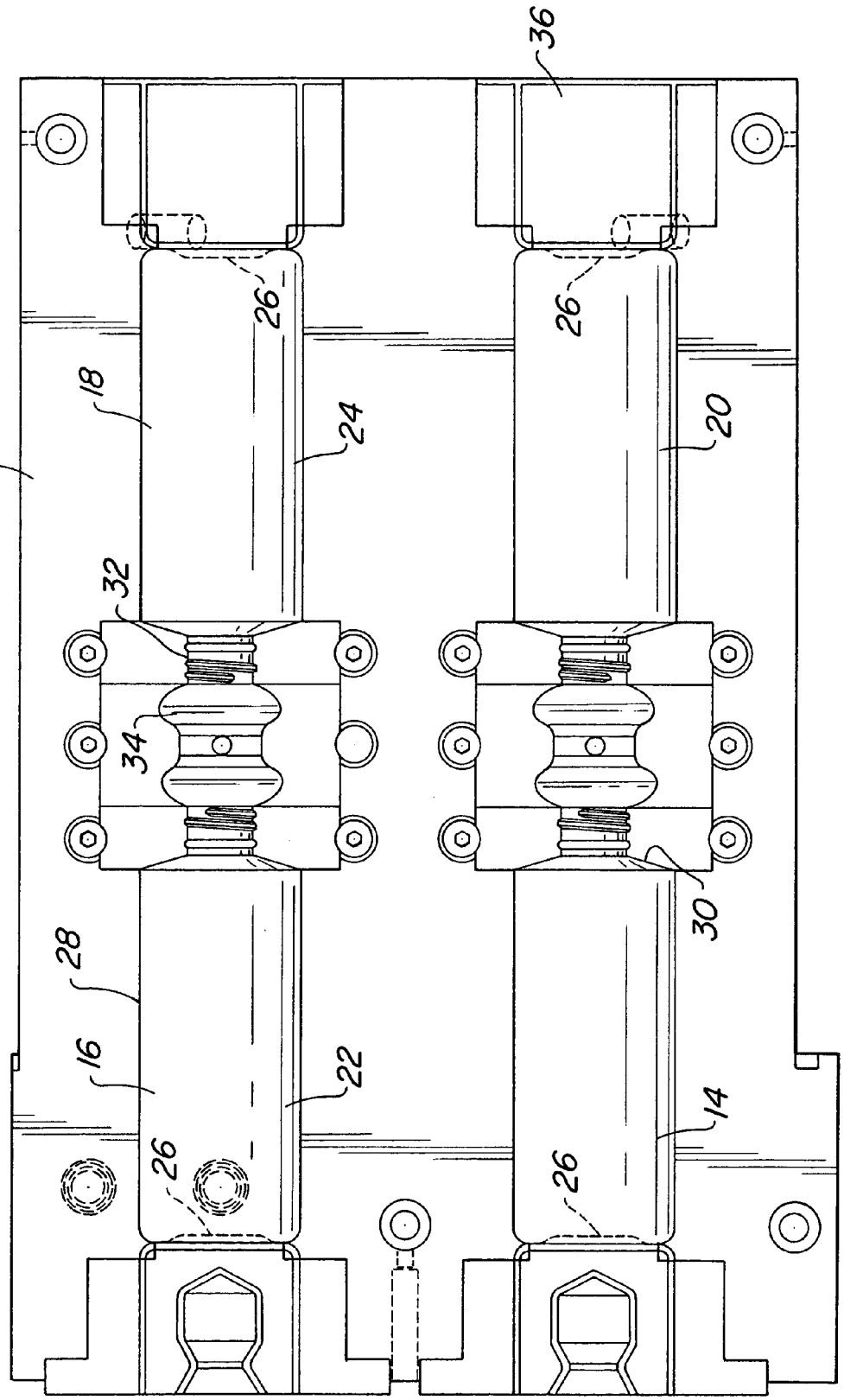
FIG. 4 is a view of a blow mold cavity.

As referenced above, a vertically-disposed wheel blow molding machine includes an outer peripheral circular array of blow molds which follow a circular path of travel as the wheel blow molding machine continuously revolves at a constant speed. For purposes of example, a portion of a wheel blow molding machine 10 rotating in a clock-wise direction "X" is illustrated in FIG. 2, and a blow mold 12 is illustrated in FIG. 4. Each mold 12 is capable of opening to receive at least one molten tube of thermoplastic material, ie. a parison, and closing to confine the parison within a cavity formed by the inner walls of the mold. As the mold rotates, a blow pin is inserted into the parison to expand it into the cavity of the closed mold, and before one complete revolution, the mold opens to release the blown article. Thus, at the end of a full revolution, the mold is empty and open in a condition ready to receive another parison.

The takeout and transfer apparatus of the present invention is particularly designed to handle multiple separate blown articles released simultaneously from a blow mold. For instance, the blow mold 12 illustrated in FIG. 4 has a pair of cavities 14 and 16 and is capable of receiving a pair of separate, parallel, spaced-apart extruded parisons (not shown) to produce a pair of separate and identical blown articles 18 and 20. Each cavity, 14 and 16, forms a blown article comprising a pair of containers, 22 and 24, each having a base 26, a substantially cylindrical body 28, a shoulder 30 and a neck finish 32. A central ring of blown material 34 interconnects the pair of facing neck finishes 32 in each blown article, and a flattened piece of flash material 36 extends from the bases 26 of each container, 22 and 24, along a mold parting line. Thus, in one revolution of the blow molding machine 10, each mold 12 is utilized to form a pair of separate blown articles, 18 and 20, which each include a pair of containers, 22 and 24, for a total of four containers per mold per revolution.

By way of example, and not by way of limitation, a contemplated embodiment of a wheel blow molding machine 10 has twenty-four identical molds, each mold capable of receiving dual parisons for producing four bottles per mold. One complete revolution results in the formation of forty-eight separate blown articles which includes ninety-six bottles. Each revolution of the blow molding machine can take, for example, approximately 8.6 seconds so that approximately 670 bottles are produced per minute which is within the above stated desired range of 500 to 850 bottles per minute. This high speed production of blow molded containers requires takeout and transfer apparatus which must be able to accomplish blown article transfer in an orderly manner such that the blown articles are efficiently and reliably positioned in a uniform single file row on a horizontally-disposed takeaway conveyor for transport to further processing stations, such as stations to remove tail flash material 36 and central ring material 34.

Figure 1:
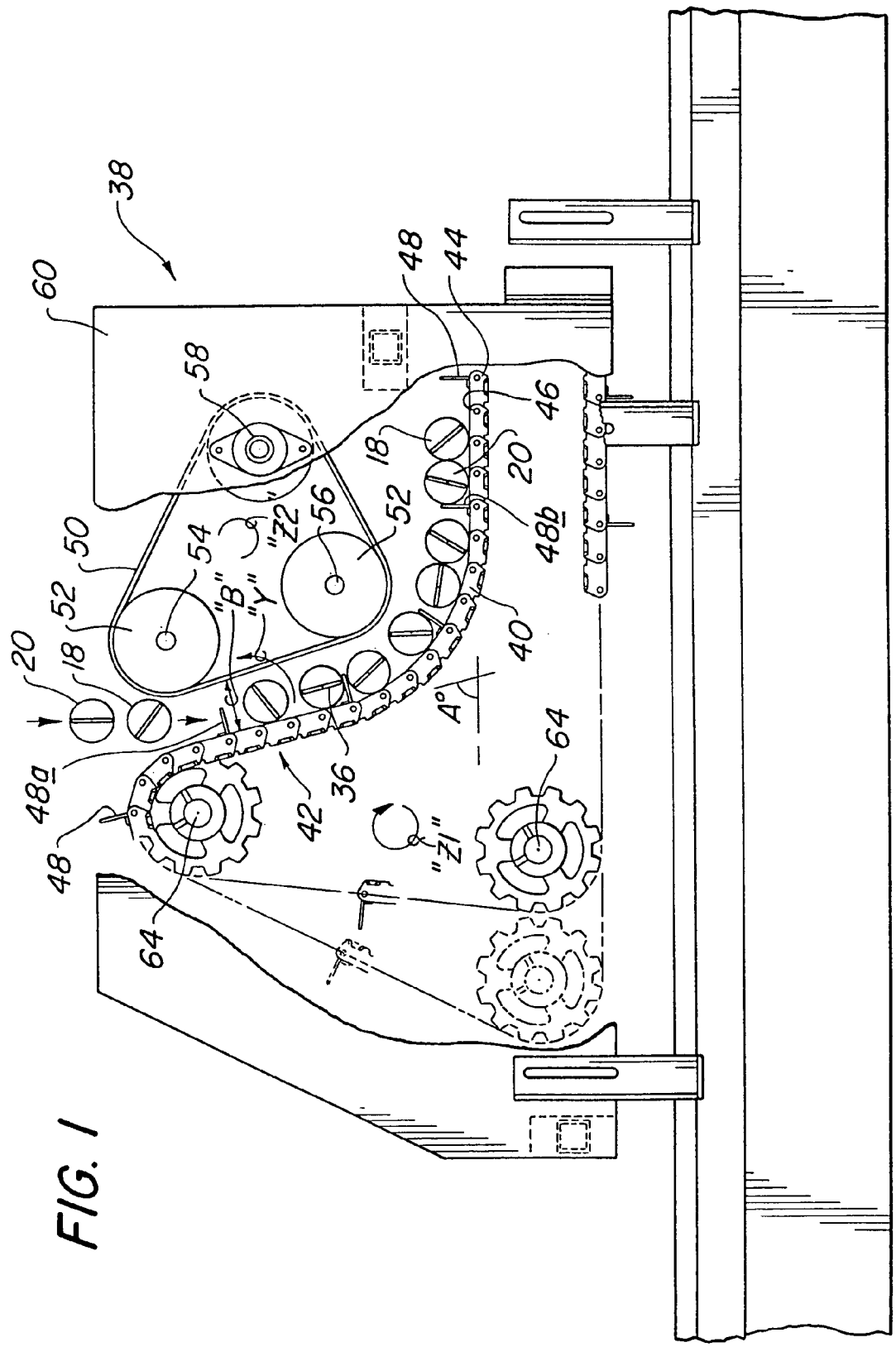
FIG. 1 is a partially cut-away side elevational view of the blown article transfer apparatus embodying the present invention.

The takeout and transfer apparatus 38 of the present invention includes a powered takeaway conveyor 40 best illustrated in FIG. 1. The conveyer 40 includes a blown article receiving end 42 and an elongate blown article transporting section 44 extending from the receiving end 42 and leading to further downstream blown article processing stations (not shown). As best illustrated in FIG. 1, the receiving end 42 is inclined at an angle "A" relative to the transporting section 44 which is substantially horizontal, and as best illustrated in FIG. 2, the receiving end 42 is positioned directly underneath the wheel blow molding machine 10.

The molds 12 open and release blown articles, 18 and 20, at a six o'clock position of the wheel 10 so that a pair of separate blown articles, 18 and 20, are released simultaneously in a free gravitational vertical fall for placement on the takeaway conveyor 40. Thus, in the above described contemplated wheel 10, two blown articles are released at a time, and approximately 167 such releases occur sequentially every minute.

The receiving end 42 is positioned to receive the blown articles as they are released by the wheel blow molding machine 10 at the six o'clock position. The conveyor 40 has a conveying surface 46 and a plurality of equally spaced upstanding flanges 48 extending therefrom perpendicularly relative to the path of travel of the conveying surface 46. The conveyor 40 and wheel blow molding machine 10 are synchronized such that each pair of simultaneously released blown articles are received between each pair of adjacent upstanding flanges 48 which function as bookends.

A powered endless positioning belt 50 is located above the takeaway conveyor 40 adjacent and facing toward the inclined receiving end 42 to confine the free falling blown articles 18 and 20 on the inclined receiving end 42 as the articles are received. To this end, the belt 50 extends parallel to the receiving end 42 a spaced distance "B" therefrom to enable the cylindrical bodies 28 of the blown articles to be simultaneously engaged by the conveying surface 46 of the receiving end 42 and the rotating positioning belt 50. In addition, one of the upstanding flanges 48 cooperates with the receiving end 42 and the positioning belt 50 to define a pocket in which a pair of separate free falling blown articles, 18 and 20, are received and uniformly aligned on the takeaway conveyor 40.

The speed of decent of the falling blown articles, 18 and 20, is decreased after being received by the apparatus 38. To this end, the leading blown article 18 of the pair of falling blown articles 18 and 20 contacts the rear side 48a of one of the upstanding flanges 48 which prevents the further free fall of the blown articles 18 and 20. The blown article 20 is supported on the leading blown article 18. At this point, the blown articles 18 and 20 are conveyed downwardly, one after the other, on the inclined conveying surface 46 of the receiving end 42 of the takeaway conveyor 40 and are confined on the receiving end 42 by the positioning belt 50.

The conveying surface 46 of the conveyor 40 travels in a direction away from the blow molding machine 10 to transport the blown articles to a downstream processing station (not shown). Thus, as illustrated in FIG. 1, the conveyer 40 rotates in a clockwise direction "Z1". The positioning belt 50 rotates in an opposite direction "Z2" which is counter-clockwise as illustrated in FIG. 1. Thus, the conveying surface 46 of the receiving end 42 and the positioning belt 50 extending along the receiving end 42 are both traveling in the same direction downward toward the horizontal transporting section 44 of the conveyor 40.

Preferably, the speed of rotation, or travel, of the positioning belt 50 is slightly less than the speed of rotation of the conveyor 40. The difference in speed of rotation, or travel, causes the blown articles 18 and 20 to slowly rotate in a counter-clockwise direction "Y" as illustrated in FIG. 1 to further slow the decent rate of the blown articles 18 and 20 down the inclined receiving end 42 of the takeaway conveyor 40. As the blown articles 18 and 20 exit the receiving end 42 onto the transporting section 44, the blown article 20 abuts the forward side 48b of one of the upstanding flanges 48, and the blown article 18 abuts the blown article 20. See FIG. 1.

The blown articles are transported on the transporting section 44 of the conveyor 40 such that their cylindrical bodies 28 uniformly rest on the conveying surface 46, they extend perpendicularly to their path of travel, and there are two blown articles between each adjacent pair of upstanding flanges 48. In addition, the blown articles are laterally adjusted so that all are in line, one after the other.

Preferably, the positioning belt 50 is formed by a pair of foam padded belts 50a and 50b which rotate in a triangular path defined by sprockets 52 which are located on three elongate shafts 54, 56 and 58 which transversely span the takeaway conveyor 40. The shafts 54, 56 and 58 are mounted on opposed vertical walls 60 and 62 located on opposite sides of the receiving end 42 of the takeaway conveyor 40 and are powered, for example, by a motor (not shown) or other means. Rotating shafts 64 of the receiving end 42 of the takeaway conveyor 40 are also mounted on the walls 60 and 62.

The spaced distance "B" between the positioning belt 50 and the conveying surface 46 of the inclined receiving end 42 is readily adjustable for use with different diameter blown articles. Thus, if a larger diameter blown article is to be transferred, the spaced distance "B" can be enlarged, and if a smaller diameter blown article is to be transferred, the spaced distance "B" can be shortened. In addition, the angle "A" of the conveying surface 46 on the inclined receiving end 42 is preferably in a range of about 60° to 85° form the horizontal.

According to another aspect of the present invention, a method of transferring blown articles from a vertically-disposed wheel blow molding machine to a horizontally disposed takeaway conveyor is provided. To this end, a pair of blown articles 18 and 20 are released from the wheel blow molding machine 10 so that the blown articles 18 and 20 exit the blow molding machine 10 simultaneously in a free gravitational vertical-fall. The free falling articles 18 and 20 are received on an inclined end 42 of a powered takeaway conveyor 40 located underneath the six o'clock position of the wheel blow molding machine 10. See FIG. 2. The blown articles 18 and 20 are confined on the inclined end 42 by a powered endless positioning belt 50 located above the takeaway conveyor 40 and extending along the inclined end 42 at a spaced distance "B" therefrom. Thus, the blown articles 18 and 20, as received, are located between and are engaged by the inclined end 42 and the positioning belt 50 to position the blown articles 18 and 20 on the takeaway conveyor 40 in a controlled uniform manner. The blown articles 18 and 20 are thereafter transported on the takeaway conveyor 40 from the wheel blow molding machine 10 to a downstream blown article processing station (not shown), such as a trimmer.

The above referenced blown article transferring method which utilizes the apparatus 38 of the present invention is capable of readily handling 500 to 850 bottles a minute in an orderly and reliable manner without requiring significant downtime for maintenance or like repairs. Of course, the apparatus and method of the present invention is also capable of handling greater numbers of bottles per minute, three or more simultaneously released blown articles, or blown articles having shapes other than that described and illustrated herein.

Thus, the above-described bottle transfer apparatus and its method of use according to the present invention provide an efficient, cost-effective, high speed means of transferring empty blow-molded containers to a trimmer. The transfer mechanism utilizes a takeaway conveyor having an inclined end and upstanding flanges in combination with a powered endless positioning belt to catch bottles released in free fall from a wheel blow molding machine and decelerate and position the bottles in a uniform orderly manner on the takeaway conveyor. The cost of manufacturing and/or buying such a mechanism is less than that of known vacuum pick and place machines and downtime caused by maintenance and repair are reduced.

While a preferred apparatus and method have been described in detail, various modifications, alterations, and changes may be made without departing from the spirit and scope of the transfer apparatus and method according to the present invention as defined in the appended claims.

The invention claimed is:

1. A method for removing blown articles from a vertically disposed wheel blow molding machine and placing the articles in a controlled uniform manner on a takeaway conveyor, comprising:

releasing blown articles from a vertically disposed wheel blow molding machine so that said blown articles exit said blow molding machine in a free gravitational vertical-fall;

receiving said free falling articles on an inclined end of a powered takeaway conveyor located underneath said wheel blow molding machine;

confining said blown articles on said inclined end of said takeaway conveyor with a powered endless positioning belt located above said takeaway conveyor and extending along and a spaced distance from said inclined end of said takeaway conveyor such that said blown articles are located between and are engaged by said inclined end and said positioning belt to position said blown articles on said takeaway conveyor in a controlled uniform manner; and transporting said blown articles on said takeaway conveyor away from the wheel blow molding machine.

2. A method according to claim 1, wherein said blown articles are released two at a time from the wheel blow molding machine and are received two at a time on said inclined end of said takeaway conveyor.

3. A method according to claim 2, wherein each blown article includes a pair of bottles integrally attached by flash material, whereby four bottles in a two by two manner are released at a time from the wheel blow molding machine.

4. A method according to claim 3, wherein at least 500 bottles per minute are transferred in a uniform manner from said wheel blow molding machine to said takeaway conveyer.

5. A method according to claim 4, wherein at least 700 bottles per minute are transferred in a uniform manner from said wheel blow molding machine to said takeaway conveyer.

6. A method according to claim 5, wherein at least 850 bottles per minute are transferred in a uniform manner from said wheel blow molding machine to said takeaway conveyer.

7. A method according to claim 2, wherein said inclined end of said takeaway conveyor is inclined at an angle within a range of between about 60° to 85° relative to the horizontal.

8. A method according to claim 7, wherein an elongate portion of said positioning belt extends along and faces a major portion of said inclined end of said takeaway conveyor and is substantially parallel to said inclined end.

9. A method according to claim 8, wherein a conveying surface of said inclined end of said takeaway conveyor advances at a predetermined speed in a downward direction, and wherein said elongate portion of said positioning belt advances at a predetermined speed in a downward direction such that said blown articles confined between said conveying surface of said inclined end and said positioning belt are conveyed downwardly.

10. A method according to claim 2, wherein said takeaway conveyor has a plurality of equally spaced-apart upstanding flanges, and wherein a pair of blown articles are received on said inclined end and are located between a pair of adjacent upstanding flanges.

11. A method according to claim 10, further comprising the step of synchronizing said takeaway conveyor with said wheel blow molding machine such that a pair of separate blown articles are located on said inclined end of said takeaway conveyor between each adjacent pair of upstanding flanges.

* * * * *